(12) United States Patent
Addleman

(10) Patent No.: US 7,874,265 B1
(45) Date of Patent: Jan. 25, 2011

(54) RESTRICTED ACCESS ANIMAL FEEDER UTILIZING PHYSICAL MEANS OF RESTRICTION

(76) Inventor: Rachel Addleman, 7602 Oak Fern, Houston, TX (US) 77040

( * ) Notice: Subject to any disclaimer, the term of this patent is extended or adjusted under 35 U.S.C. 154(b) by 205 days.

(21) Appl. No.: 12/319,636

(22) Filed: Jan. 8, 2009

(51) Int. Cl.
*A01K 1/10* (2006.01)
(52) U.S. Cl. .............................. 119/63; 119/865; 119/59
(58) Field of Classification Search ................. 119/712, 119/719, 51.02, 59, 63, 865, 51.01, 52.3, 119/52.4, 56.1, 62, 61.3
See application file for complete search history.

(56) References Cited

U.S. PATENT DOCUMENTS

| | | | |
|---|---|---|---|
| 4,426,955 A | 1/1984 | Monroe et al. | |
| 4,655,170 A | 4/1987 | DaSilva | |
| 5,570,655 A | 11/1996 | Targa | |
| 5,669,328 A | 9/1997 | Lanfranchi | |
| 6,044,795 A | 4/2000 | Matsuura | |
| 6,349,671 B1 | 2/2002 | Lewis et al. | |
| 6,651,584 B2 | 11/2003 | van den Berg | |
| 6,907,843 B2 | 6/2005 | van den Berg | |
| 7,051,674 B2 | 5/2006 | van den Berg | |
| 7,100,534 B2 | 9/2006 | van den Berg | |
| 7,124,707 B1 | 10/2006 | Clarke | |
| 2002/0134313 A1* | 9/2002 | King et al. ................ | 119/51.02 |
| 2005/0061252 A1* | 3/2005 | Meeks et al. .............. | 119/51.02 |
| 2005/0217591 A1 | 10/2005 | Turner | |
| 2006/0219187 A1* | 10/2006 | Krishnamurthy ............. | 119/719 |
| 2007/0125306 A1* | 6/2007 | Beecher ................... | 119/51.02 |
| 2008/0072843 A1* | 3/2008 | Malacarne et al. .......... | 119/719 |
| 2010/0089329 A1* | 4/2010 | Lefferson ................ | 119/51.02 |
| 2010/0212600 A1* | 8/2010 | Knies ......................... | 119/719 |

* cited by examiner

*Primary Examiner*—Timothy D Collins
*Assistant Examiner*—Joshua Huson
(74) *Attorney, Agent, or Firm*—Thomas I. Rozsa

(57) ABSTRACT

The present invention is a novel device having two primary components. The first component is a specialized collar and the second component is a feeder. The specialized collar has a pendant from which an activation magnet hangs. The feeder has a magnetic sensor which is placed in a location so as to sense the magnet from the collar. The feeder is in the open condition except when an animal wearing a specific magnet approaches a feeder, an activation mechanism causes a restriction mechanism to be placed over the food access so that the animal wearing the collar cannot have access to the food. When the animal goes away from the feeder, the restriction is removed so that other animals who do not have the collar will have access to the food.

15 Claims, 5 Drawing Sheets

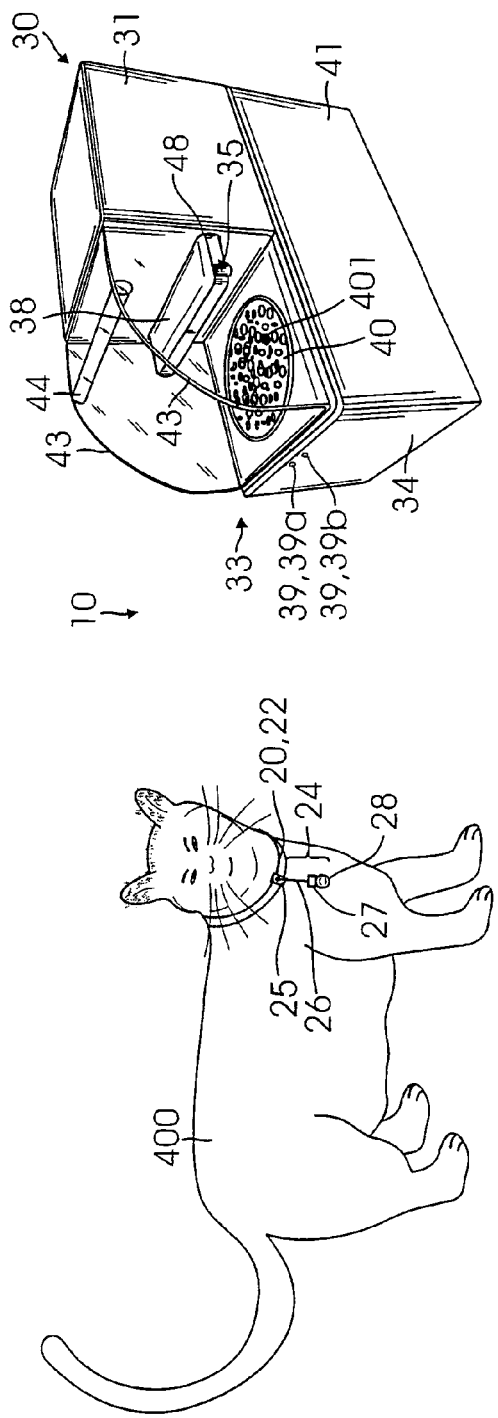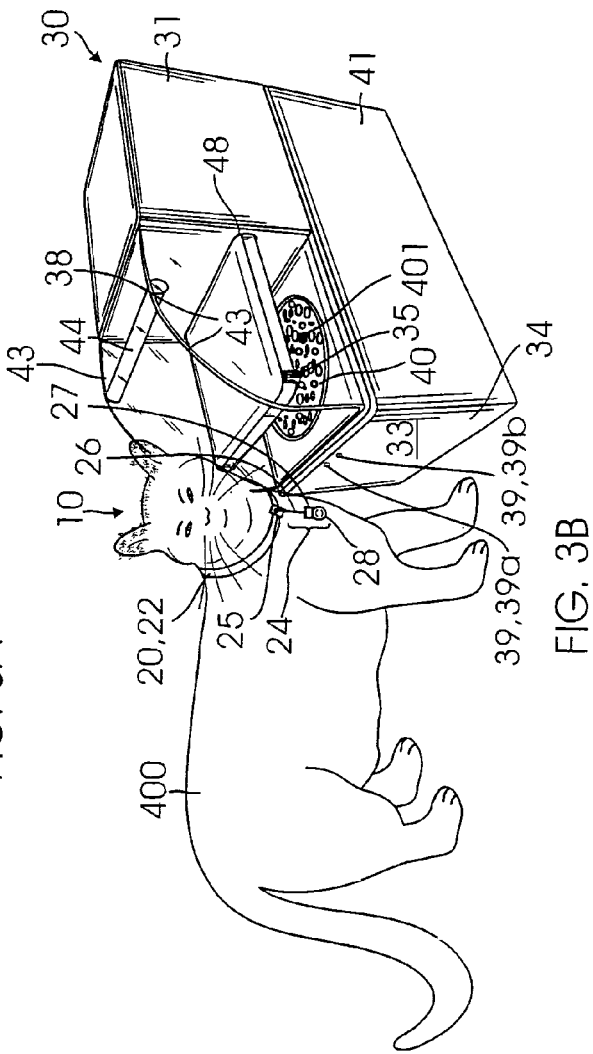
FIG. 3A
FIG. 3B

RESTRICTED ACCESS ANIMAL FEEDER UTILIZING PHYSICAL MEANS OF RESTRICTION

BACKGROUND OF THE INVENTION

1. Field of the Invention

This invention relates to restriction of access to animal food, and, more particularly, to the mechanical restriction of access to food for small domesticated pets.

2. Description of the Prior Art

Pet owners are more conscious of the dietary needs of their pets. Whether it is by doctor's orders or by the initiative of the owner, more and more pet owners have the need to control the diet of their pets. When there are more than one pet in the home, a frequent problem is that one pet tends to also eat another's food. Whether the issue is preventing an overweight pet from eating the other's food or to ensure that one pet is getting all its allotment of its special diet, a need exists in the home to ensure that this occurs.

Controlled animal feeders are well known in the art and tend to fall into one of two categories, those pertaining to livestock and those pertaining to household pets. Of those pertaining to household pets, most employ complicated circuits using microprocessors and transmitters.

The following 14 patents and published patent applications are relevant to the field of the present invention.

1. U.S. Pat. No. 4,426,955 issued to Marvin E. Monroe et al. and assigned to Optek, Inc. on Jan. 24, 1984 for "Identification And Animal Feeding Apparatus" (hereafter the "Monroe Patent");

The Monroe Patent is an automated livestock feeding apparatus having a plurality of magnetic tags each respectively suspended from a specific animal and having a specific code in the feeder which is detected by a plurality of spaced apart reed switches. The farmer programs the feeding apparatus such that when the sensor reads the magnetic tag around the animal's neck, the feeding apparatus will dispense a ration of fodder specific to that tag. The Monroe Patent is designed for very large livestock and not for small pets.

2. U.S. Pat. No. 4,655,170 issued to Daniel R. DaSilva on Apr. 7, 1987 for "Animal Identification Feed Control System" (hereafter the "DaSilva Patent");

The DaSilva Patent is an involved device which discloses how to deliver a predetermined amount of feed to the livestock, with a readout for animal record keeping and system review. The DaSilva Patent is designed for very large livestock and not for small pets.

3. U.S. Pat. No. 5,570,655 issued to Anthony Targa on Nov. 5, 1996 for "Device For Controlling Animal Access To A Location" (hereafter the "Targa Patent");

The Targa Patent prevents an animal from eating from the food bowl, by having that animal trigger an alarm or loud noise that frightens it away.

4. U.S. Pat. No. 5,669,328 issued to Tammy Lanfranchi on Sep. 23, 1997 for "Automatic Animal Feeding System" (hereafter the "Lanfranchi Patent");

The Lanfranchi Patent teaches a very different structure, having a covered food dish with a triangular top with a closeable opening of sufficient size to allow an animal's head to enter to get access to the food dish. The animal that is permitted to eat from the dish wears a collar with a transceiver. When the animal comes in proximity of the dish, a mating sensor receives recognition from the transmitter and causes the triangular top to rotate so that the opening becomes uncovered to allow the animal to eat.

5. U.S. Pat. No. 6,044,795 issued to Taketoshi Matsuura et al. and assigned to Matsushita Electronics Corporation on Apr. 4, 2000 for "Automatic Feeding System Having Animal Carried Transmitter Which Transmits Feeding Instructions To Feeder" (hereafter the "Matsuura Patent");

The Matsuura Patent is a food delivery system which dispenses a pre-programmed quantity of food into a feed bowl when it senses the animal's transmitter. The transmitter is implanted in the body of the animal.

6. United. States Patent No. 6,349,671 issued to Nan R.W. Lewis et al. on Feb. 26, 2002 for "Pet Feeding System And Method Of Using Same" (hereafter the "Lewis Patent");

The Lewis Patent discloses four separate covered dishes with activation mechanisms that are programmed so that the dishes can open when the cat wearing a transmitter tag, which generates a radio signal, comes in proximity of the dish. The food dish is kept inaccessible to all animals until the desired cat's transmitter comes in proximity to the signal transceiver causing the food dish to open to allow the cat to eat.

7. United States Published Patent Application No. 2002/0134313 to Robert Andrew King on Sep. 26, 2002 for "System, Method And Apparatus For Controlling Animal Feeding" (hereafter the "King Published Patent Application");

The King Published Patent Application discloses a covered feed dish that opens when it receives a radio signal from a transmitter on the animal. The feeding method can be programmed to not open except during certain hours. This transmitter may be implanted on the animal or permanently affixed to the animal, and may transmit data to the transceiver, such as whether the animal has already eaten that day. The covered feed dish includes a temperature control device to prevent spoilage and a spray device to chase animals away from the dish.

8. U.S. Pat. No. 6,651,584 issued to Karel van den Berg and assigned to Lely Research Holding A.G. on Nov. 25, 2003 for "Feed Metering And Animal Identification Device With Load Sensor And Closing Means" (hereafter the "'584 van den Berg Patent");

The '584 van den Berg Patent discloses a feed metering device for distributing feed in metered portions to an animal. Based on information received from the animal's ID tag, the device weighs the fodder or drink and delivers a specific quantity of either food or drink to the animal. The device also monitors the amount of food the animal eats and how much fodder is left in the device.

9. United States Published Patent Application No. 2005/0061252 to Glenn Meeks et al. on Mar. 24, 2005 for "Pet Feeding Dish And Method" (hereafter the "Meeks Published Patent Application");

The Meeks Published Patent Application discloses a pet feeding system wherein the system uses pulse width identification to provide a more effective identification of a unique signal from a remote circuit in a pet tag. Utilizing a sophisticated digital circuit, the device is capable of identifying more than one remote circuit such as two or more pets at the same time. A hopper holds extra food that is meted out and a flap will rise to allow the animal to eat.

10. U.S. Pat. No. 6,907,843 issued to Karel van den Berg and assigned to Lely Research Holding AG on Jun. 21, 2005 for "Feed Metering And Animal Identification Device With Load Sensor And Closing Means" (hereafter the "'843 van den Berg Patent");

The '843 van den Berg Patent is the same patent as the '584 van den Berg Patent, discussed above, but is a divisional application having different claims of invention with respect to the device.

11. United States Published Patent Application No. 2005/0217591 to Robert Michael Turner on Oct. 6, 2005 for "Animal Feeding Device And Method" (hereafter the Turner Published Patent Application");

The Turner Published Patent Application discloses a hopper that is programmed to deliver a specific quantity of food based on information it receives from the animal's transmitter. This device maintains specific feeding schedules and specific diets for animals.

12. U.S. Pat. No. 7,051,674 issued to Karel van den Berg and assigned to Lely Research Holding AG on May 30, 2006 for "Feed Metering Device" (hereafter the "'674 van den Berg Patent");

The '674 van den Berg Patent is again another division of the previously discussed '584 van den Berg Patent having different claims of invention on the same concept.

13. U.S. Pat. No. 7,100,534 issued to Karel van den Berg and assigned to Lely Research Holding AG on Sep. 5, 2006 for "Feed Metering And Animal Identification Device Having Angularly Displaceable Weighing Means" (hereafter the "'534 van den Berg Patent);

The '534 van den Berg Patent is again another patent which has the same concept as '584 van den Berg Patent but with different claims of invention.

14. U.S. Pat. No. 7,124,707 issued to Jennifer Ann Clarke on Oct. 24, 2006 for "Selective Animal Feeding Apparatus" (hereafter the "Clarke Patent).

The Clark Patent discloses the ability to have selective food access to a specific animal wearing a continuously emitting transmitter.

While the prior art has feeder devices for livestock have magnetic tags, those feeders are large, bulky, require programming and have expensive and delicate electronics. Prior art feeder devices for small domesticated pets also have expensive and delicate electronics. The use of these electronics is a significant problem. The relative fragility and expense of these electronics subject the equipment to frequent breakages, repairs, maintenance, and replacements. Additionally, all the prior art are designed to not allow access unless and until the right animal approaches, which means that if any of the electronics break down or are programmed incorrectly, no animal gets any food because the electronics will not dispense any food or allow any access if the electronics breaks down. Pet owners are not pleased at the constant expense for repairs and replacements nor at coming home to find that their pet has not had any food all day or all weekend.

There exists a need for a pet feeder that allows access to food unless and until an animal that should not partake of the food in the feeder approaches. There exists a need for a restricted access pet feeder that has the ability to adjust to the height and size of the animal, so as to grow with the animal. There exists a need for a restricted access pet feeder that has the ability to adjust the size of the opening where the food is. There exists a need for a restricted access pet feeder that eliminates expense and delicate electronic parts. There exists a need for a restricted access pet feeder that eliminates the necessity of having wireless transmitters which are much more expensive which is what most of the cat dishes have. There exists a need for a restricted access pet feeder for small animals that does not use transmitters or transceivers, or other devices which add to the expense and cost of manufacture, production, sales, and repairs of animal feeders.

SUMMARY OF THE INVENTION

The present invention resolves the problems of the prior art. The present invention does not utilize microprocessors, transmitters, transceivers or other delicate electronics. The present invention is designed with simplicity for small domesticated animals, with only one, seldom moving part. The present invention will not cause an animal to starve if the electronics break or fail. The present invention is inexpensive to manufacture and purchase and can be highly decorative.

The present invention is a novel device having two primary components. The first is a specialized collar and the second is a feeder. The specialized collar has a pendant from which hangs two magnets. The first magnet is weaker than the second magnet and is permanently affixed to the pendant. The second magnet is stronger than the first magnet and is affixed to the pendant by its magnetic attraction to the first magnet. This allows an animal wearing the specialized collar to release itself should the animal become magnetically attached to a fixed object, such as a refrigerator. The animal's natural pull will separate the first and second magnet from each other and release the animal. The second magnet will remain magnetically attached to the object until removed, after which the second magnet is preferably re-attached to the first magnet on the pendant of the specialized collar. This specialized collar is placed on the animal that should not eat from the feeder.

The feeder is preferably adjustable in height and head-width or available in various heights and head-widths. The feeder has an area in which the pet food is placed and having a default state of being open or available. The feeder has a magnetic sensor which is placed in a location so as to sense either the first magnet, the second magnet or both magnets on the pendant of the specialized collar. When the feeder senses the magnets of the specialized collar, a cover quickly, but safely, emerges from the interior of the feeder and covers the top of the food dish. Because the specialized collar is placed on the animal that should not eat from the feeder, the feeder will sense the near presence of this animal and prevent this animal from eating the food in the dish by placing the cover over the dish area. When the animal with the specialized cover moves away from the feeder, the feeder no longer senses the magnets of the specialized collar and the internal mechanisms revert to its default state and the cover recedes back into the interior of the feed, thereby uncovering the food. The feeder has an on/off switch so that the access restriction can be turned off and the feeder can be used for all feeding purposes.

First, it is an object to provide an animal feeder restricting access to the food which provides access for small domesticated pets. The present invention provides this feature.

Second, it is an object of the invention to provide an animal feeder restricting access to the food which activates only to disallow access of an animal to the food within the feeder. The present invention provides this feature.

Third, it is an object of the invention to provide an animal feeder restricting access to the food, which is adjustable in its height to correspond to the height of the specific animal anticipated to eat from the feeder. The present invention provides this feature.

Fourth, it is an object of the invention to provide an animal feeder restricting access to the food with an adjustable opening to allow a specific sized head to enter into the eating area so as to customize the feeder for a specific animal and to prevent animals with larger heads from being able to enter their heads in the eating area. The present invention provides these features.

Fifth, it is an object of the invention to provide an animal feeder restricting access to the food which is resilient to animal damage and abuse. The present invention provides this feature.

Sixth, it is an object of the invention to provide an animal feeder restricting access to the food, which is small, portable and easy to clean and care for. The present invention provides these features.

Seventh, it is an object of the invention to provide an animal feeder restricting access to the food, which is simple. The present invention is very simple to use, simple to manufacture, simple to repair, as well as convenient and easy to use.

Eighth, it is an object of the invention to provide an animal feeder restricting access to the food, which is inexpensive to manufacture and eliminates parts in the prior art. Prior art devices are complex, with multiple, varied contents, such as microprocessors, transmitters, transceivers, tracking devices, programmable devices, recording devices, digital memory, etc., all requiring varied systems of manufacture. Additionally, prior art that contains a multiplicity of parts, as well as complicated apparatuses disguised as another item are expensive to manufacture. The present invention eliminates parts in the prior art and is easy and inexpensive to manufacture since the main body is only one molded or formed piece.

Ninth, it is an object of the invention to provide an animal feeder restricting access to the food, which is inexpensive to purchase. Due to the size, simplicity and uncomplicated nature of the present invention, the present invention will be inexpensive.

Tenth, it is an object of the invention to provide an animal feeder restricting access to the food employing a simple circuit utilizing a magnetic switch, which is animal appropriate. Restricted access feeders for animals exist in the prior art, but do not take into consideration the size and needs of small domesticated animals, or more specifically, small cats, small dogs, kittens or puppies. The present invention is able to fit a particular small animal and can withstand being pushed or knocked against by small animals without damage to the circuitry or the body of the feeder. The present invention is designed with a hardy design.

Eleventh, it is an object of the invention to provide an animal feeder restricting access to the food which is durable. Feeders for livestock and domesticated pets which are made with microprocessors, transmitters, transceivers or which have many moving parts or parts that move frequently are fragile and will not last as long as feeders which do not contain sophisticated electronic devices or which have movement which is the exception to access rather than the requirement to access, thus requiring movement every time access is required. The present invention is durable.

Twelfth, it is an object of the invention to provide an animal feeder restricting access to the food which is durable, which is small and portable. Animal feeders for Storage and display devices which are designed to be hung on the wall or which are large and disguised as another item are not portable. Portability offers the advantage of flexibility of placement. The present invention is small and easily portable.

Thirteenth, it is an object of the invention to provide an animal feeder restricting access to the food which is marketable. With the rise in the pet health care, pet obesity, and increased awareness of animal needs, pet owners have become very active and very knowledgeable about the proper care and feeding of their pets. The present invention easily lends itself to the craft and scrap booking markets. Marketing slogans and packaging directed at veterinarians, kennels, pet hospitals, pet hotels, and pet would be very effective and salable. Additionally, there is an endless market for the present invention, as the pet population continues to grow and people continue to care for and pamper their pets. The present invention is salable, marketable and has an endless, non-seasonable market.

Fourteenth, it is an object of the invention to provide an animal feeder restricting access to the food which is novel. While other patents for restricted access animal feeders exist, the present invention device has several novel features, one of which is having the food area accessible by all animals, unless and until an animal that should not eat the food, approaches the animal feeder, so that if the electronics fail, the food is still available to the animal and the animals will not go hungry. Another novel feature is the release mechanism on the magnetic collar, which allows an animal to detach itself from an object, such as a refrigerator, should the magnet on the animal's collar become attracted to and attached to the object. The present invention is unique and novel over other animal feeders.

Fifteenth, it is an object of the invention to provide an animal feeder restricting access to the food that is appealing and desirable so that someone who sees one demonstrated by another person will want one too. The animal feeder of the present invention easily lends itself to decorative colors, designs, images, advertising and customization. Veterinarians and pet owners may place the animal feeder in locations that not only are practical and demonstrate the unique and novel functions and features of the animal feeder, but also display the decorative or advertising nature of the animal feeder. Other pet owners may see the animal feeders of their friends and envisage the very cute and customizable possibilities. The present invention is appealing and desirable.

Sixteenth, it is an object of the invention to provide an animal feeder restricting access to the food that is lightweight and small. Prior art devices are large, bulky and heavy. Kennel owners, veterinarians, and pet owners need to feed their animals at least once, if not more often a day. The prior art illustrates feeders that are heavy, bulky and too cumbersome to carry and clean. The present invention is made from a light weight molded plastic or polymer and the internal mechanisms are as simple and light weight as possible. Furthermore, the small and light weight nature allows the restricted access animal feeder to be located anywhere or easily tucked away. The present invention is lightweight, small and compact.

Seventeenth, it is an object to provide an animal feeder restricting access to the food which is reliable, reusable, operable, of good quality and useful in its own right. The use of the invention does not depend on others. The quality is high; the product is inexpensive, but not cheap. It is consistent, easy to operate and can be used again and again. The present invention has all of these features.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3A is a depiction of use of a preferred embodiment of the present invention illustrating a front perspective view of the feeder apparatus in non-restricted access mode and a front perspective view of the collar around the neck of an animal at a distance at which the feeder apparatus is unable to sense the collar;

FIG. 3B is a depiction of use of a preferred embodiment of the present invention illustrating a front perspective view of the feeder apparatus in restricted access mode and a front perspective view of the collar around the neck of an animal at a distance at which the feeder apparatus may sense the collar;

DETAILED DESCRIPTION OF THE PREFERRED EMBODIMENTS

Figure 1:
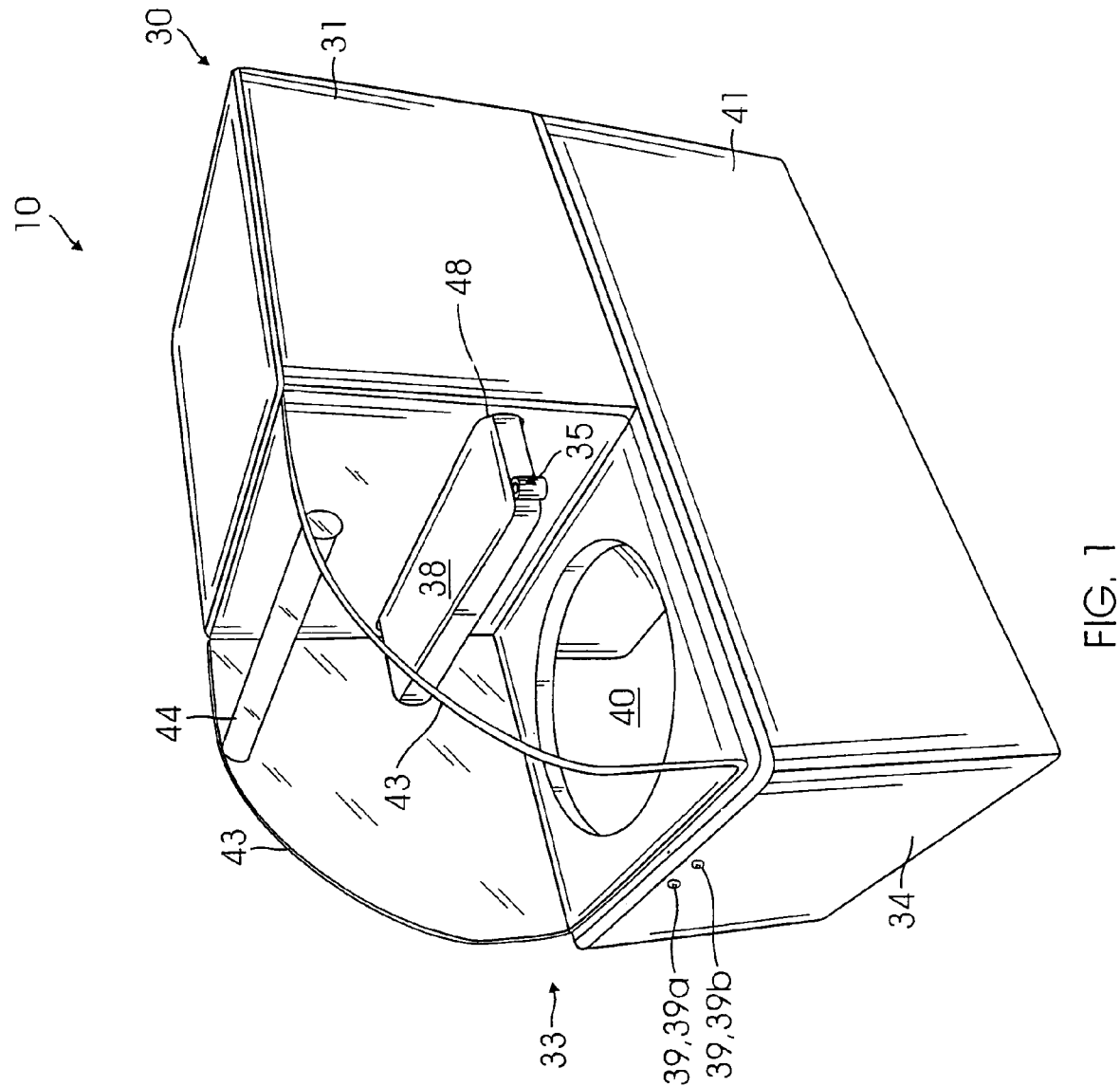
FIG. 1 is a front perspective view of a preferred embodiment of the present invention illustrating the feeder apparatus in a non-restricted access position.
Figure 2:
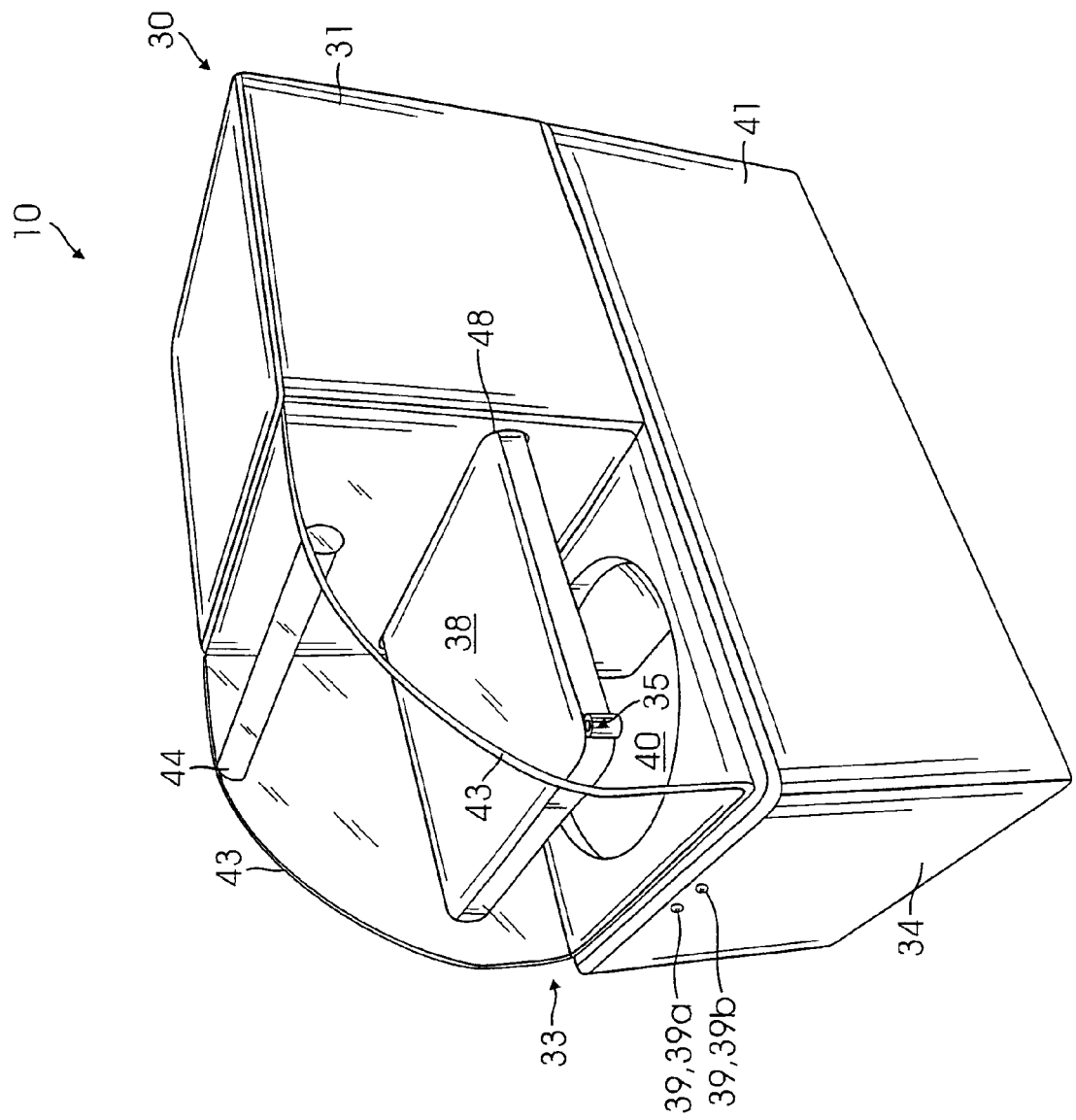
FIG. 2 is a front perspective view of a preferred embodiment of the present invention illustrating the feeder apparatus in a restricted access position.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 5, there is illustrated a restricted access animal feeder 10. The restricted access animal feeder 10 has two primary components: a feeder 30 and an activation mechanism 20.

The activation mechanism 20 can take many forms but is illustrated here as a pendant 24 that hangs from a collar 22 by a suspension means 26. The pendant 24 is attached to the collar 22 by an affixation means 25 which preferably slides along the collar 22. At the free end of the pendant 24 are a first magnet 27 and a second magnet 28. First magnet 27 is preferably permanently affixed to the suspension means 26. Second magnet 28 is releasably attached to first magnet 27 by their respective attractive magnetic forces. First magnet 27 and second magnet 28 have magnetic forces that are strong enough to allow activation mechanism 20 to function operationally, but weak enough to detach from each other based on the pull of the animal. Should the second magnet 28 become attracted to and held by some other metal object, the animal may detach itself from this object, thus leaving second magnet 28 attached to the metal object. While the activation mechanism 20 works best with both first magnet 27 and second magnet 28 in place, it may still function operationally with only first magnet 27.

Feeder 30 has a lower housing 41 which sets the height for the eating area 40, generally contains and protects the inner mechanisms, such as electric motors 36 and 37 and a cover panel 38, and provides general support for the structure and such items as a feed bowl 401 and shield 43.

Feeder 30 has a cover panel 38. While there are many means by which the cover panel 38 may be extended over or retracted from the eating area 40, the simplest example is illustrated here as the cover panel 38 internally connected to a pair of electric motors 36 and 37, which retract and extend the cover panel 38 over the eating area 40 located in the front 33 of the feeder. The cover panel 38 has a pair of fenders 35 which have the dual purpose of guiding the cover panel 38 in a straight manner during the extension and retraction of the cover panel 38, and act as a further insurance that the cover panel 38 does not retract fully within the interior of the feeder 30.

The eating area 40 is surrounded by a shield 43. Additionally, a support bar 44 near the top of the open area above the eating area 40 adds cross support to the sidewalls of the shield 43. The shield 43 prevents an animal from eating from the sides of the eating area, and the support bar 44 has the added benefit of preventing an animal from eating from the top of the eating area. Thus, the shield 43 and the support bar 44 provide that the only approach an animal may make to the eating area 40 is from the front 33 of the feeder 30. Because the eating area 40 is only approachable from the front due to the position of the shield 43 and the support bar 44, the animal 400 must place its head and neck in only one location from only one direction in order to reach the feed bowl 401 and eat. Due to the forced directional approach to the food bowl 401, when the animal 400 approaches the eating area 40, the pendant 24 on the collar 22 of the animal will be in close proximity to the front wall 34 of the feeder 30. Accordingly, near the eating area 40 and along the front wall 34 is a sensor 39. Sensor 39 is located in a position in the front of feeder 33 area on the front wall 34 in a manner that enables it to sense the pendant 24 on the collar 22 around the neck of an animal 400, in particular, the sensor 39 senses either first magnet 27, second magnet 28, or both. The width of the shield 43 is preferably adjustable to accommodate a variety of animals and animals with large or small faces. The front wall 34 of the feeder 30 is preferably adjustable in height so as to accommodate, for example, a kitten as well as a full grown cat. Likewise, the sensor 39 may also be adjustable so as to properly sense the pendant 24 hanging from the collar 22 of a short animal or a tall animal.

Sensor 39 is comprised of two metal pins 39a and 39b. When either magnet 27 or magnet 28 or both are in the near presence of sensor 39, the magnets 27, 28 are attracted by the metal pin 39a, 39b. This attraction will cause a magnetic switch to close the circuit to electric motor 36. The internal circuits are designed so that when the sensor 39 detects the pendant 24, the cover panel 38 is brought forward through a slot 48, extending over the eating area 40, thereby preventing the animal 400 wearing the collar 22 having the pendant 24 from eating from the feed bowl 401. When the animal 400 with the pendant 24 moves away from the eating area 40 and the sensor 39 no longer detects the pendant 24, the cover panel 38 retracts and the feed bowl 401 in the eating area 40 is uncovered, thereby allowing any animal not wearing the pendant 24 to eat from the feed bowl 401.

Figure 4:
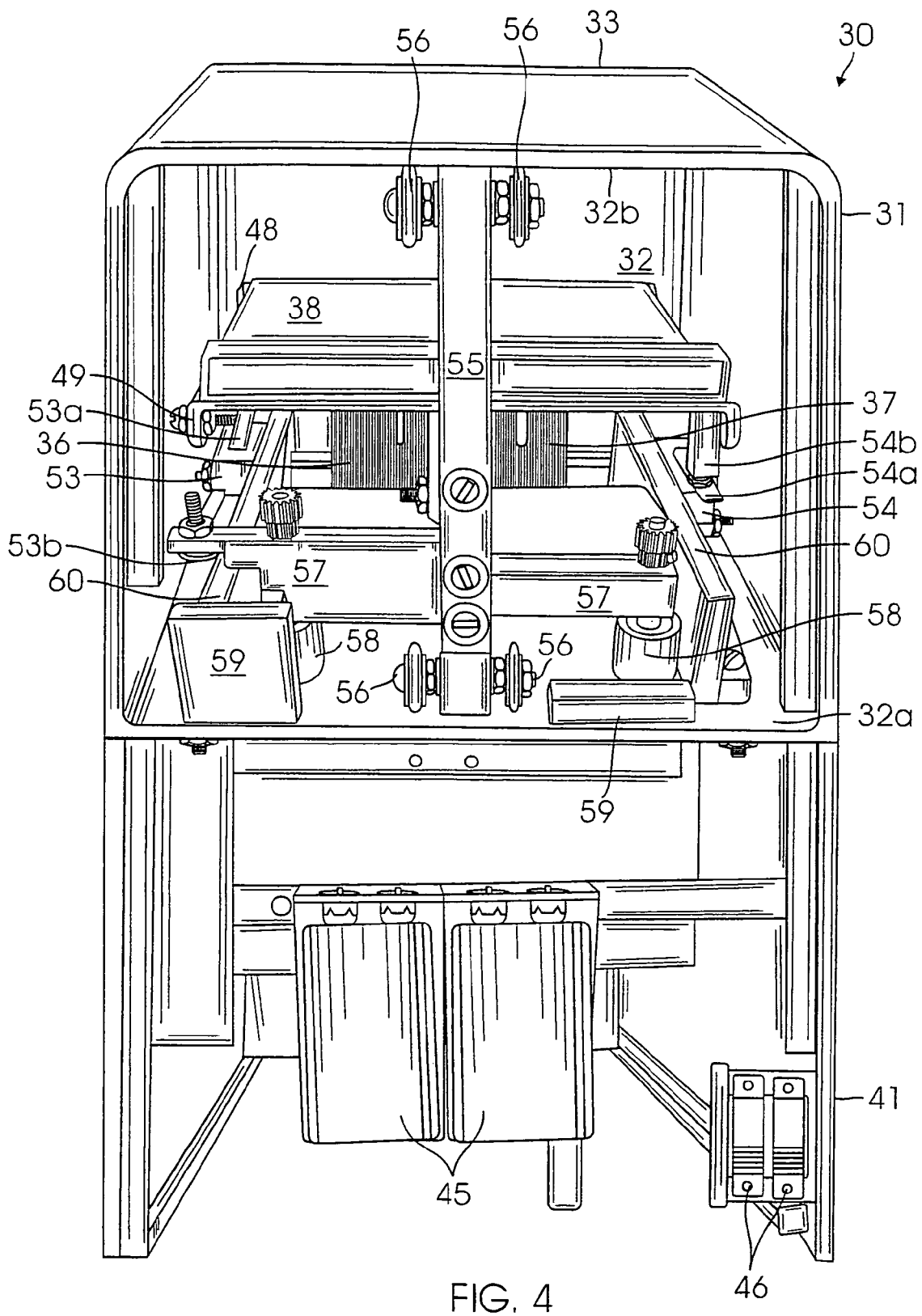
FIG. 4 is a rear perspective view of a preferred embodiment of the present invention having the back cover removed so as to illustrate the interior configuration and mechanisms of the feeder apparatus when the feeder apparatus is in non-restricted access mode.
Figure 5:
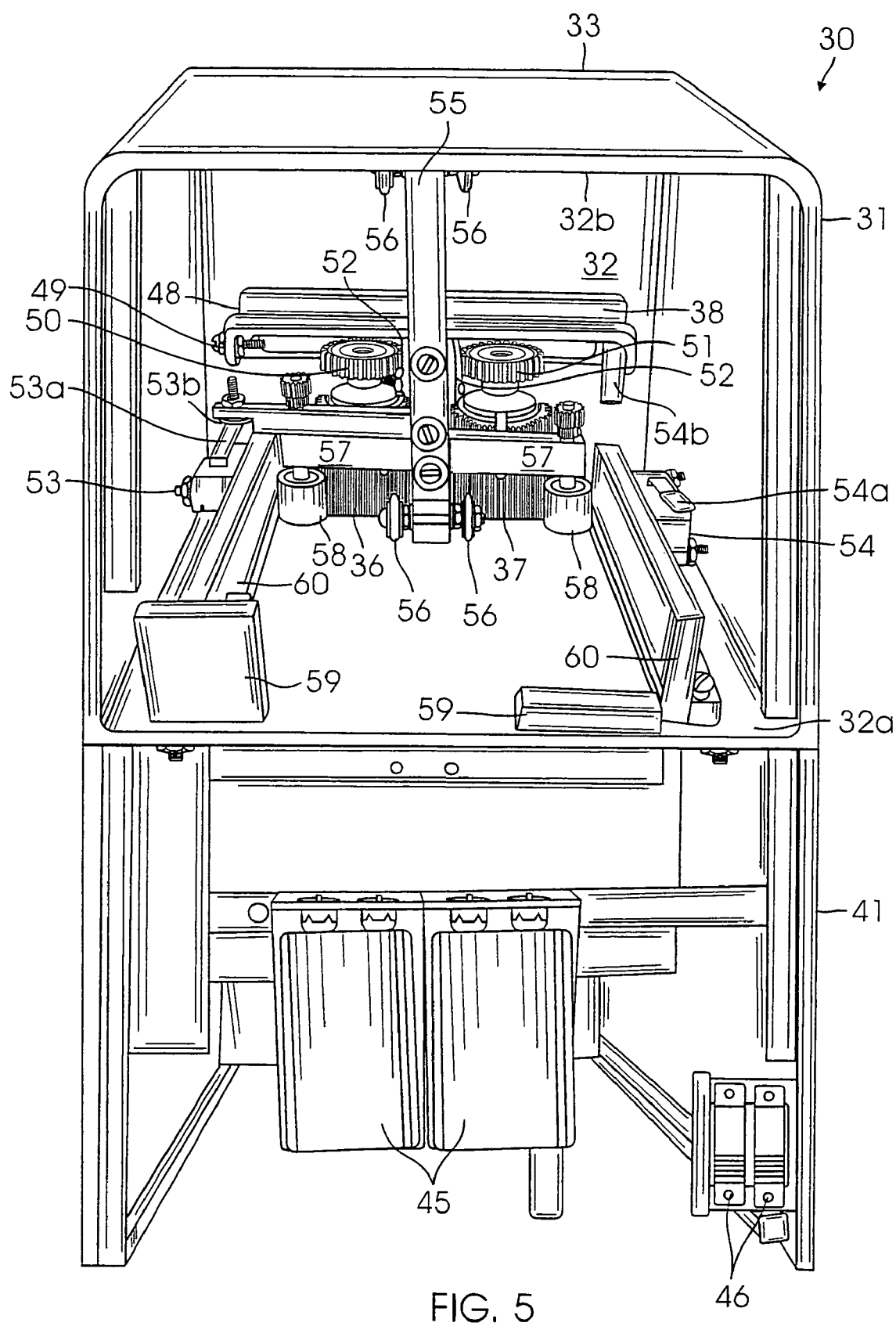
FIG. 5 is a rear perspective view of a preferred embodiment of the present invention having the back cover removed so as to illustrate the interior configuration and mechanisms of the feeder apparatus when the feeder apparatus is in restricted access mode.

The cover panel 38 is mounted on a cover panel platform 49. The cover panel platform 49 supports and is mounted by the cover panel 38 by a transverse cross bar (not shown) that extends from the vertical guide 55 to the far end of the cover panel 38. Transverse cross bar has a secondary purpose of being a double sided linear rack 52. Vertical guide has wheels 56 to facilitate the movement to and fro within the interior of the upper housing 31 and to provide vertical stability during extension and retraction of the cover panel 38. While it is preferred that at least one wheel 56 reside at the bottom of the vertical guide 55, the present invention contemplates a variety of numbers, combinations, and locations of wheels 56 required to perform such facilitation. Here, as illustrated in FIGS. 4 and 5, vertical guide 55 has two pair of wheels 56, one pair along the bottom of vertical guide 55 to roll along the base 32a of the platform area 32 and the second pair to roll along the ceiling 32b of the platform area 32. Affixed to vertical guide 55 is a horizontal bar 57. Horizontal bar 57 supports at least one bumper 58 to provide a smooth and quiet stop to the retraction movement of the cover panel 38. At least one backstop 59 is provided for each bumper 58. The at least one bumper 58 also serves to provide horizontal guidance and stability during the extension and retraction of the cover panel 38. To facilitate the horizontal guidance, there is at least one bracket 60.

There are illustrated in FIGS. 4 and 5, the feeder 30 as having two motors, electric motor 36 and electric motor 37. Electric motor 36 is associated with the extension of the cover panel 38 over the eating area 40 and Electric motor 37 is associated with the retraction of the cover panel 38 from the eating area 40. Each electric motor 36, 37 is operationally connected to a rotary gear 50 and 51. Rotary gear 50 has a diameter equal to rotary gear 51. Rotary gear 50 lies along one side of and meshes with the teeth of a double sided linear rack 52. Rotary gear 51 lies along the other side of and meshes with the teeth along the other side of the double sided linear rack 52. Rotary. gears 50 and 51 may freely move independent of their respective motors 36 and 37, so that when rotary gear 50 is engaged by electric motor A 36 and is moving the double sided linear rack 52, rotary gear 51 may freely rotate according to the movement of the double sided linear rack 52 without damage to or impedance from electric motor 37, to which it is operationally connected. When rotary gear 51 is engaged by electric motor 37 and is moving the double sided linear rack 52, rotary gear 50 may freely rotate according to the movement of the double sided linear rack 52 without damage to or impedance from electric motor 36, to which it is operationally connected.

The circuits for electric motors 36 and 37 are designed in a manner that the circuit for each motor 36, 37 has two places where the circuit can be open. The first is at the magnetic switch, which is activated by the sensor 39. The default condition for the magnetic switch associated with electric motor 36 is open and the default condition for the magnetic switch associated with electric motor 37 is closed. When the sensor 39 activates the magnetic switch because the pendant 24 is in close proximity, the default conditions of each circuit changes: the magnetic switch associated with electric motor 36 closes and the magnetic switch associated with electric motor 37 opens. The second location in the electric motors' 36, 37 circuits where the circuit may be opened is at a second switch 53 and 54. Second switches 53 and 54 are closed when their respective levers 53a and 54a are depressed. The default condition for lever 54a, which is associated with electric motor 36 is in a closed position. The default condition for lever 53a, which is associated with electric motor 37 is in an opened position. The second switches 53 and 54 can be located anywhere that facilitates the operation of the feeder 30, but are here shown adhered to the brackets 60. There are two appendages 53b and 54b which reside on the cover panel platform 49. As the cover panel platform 49 moves to and fro within the upper housing 31 when it extends and oho retracts the cover panel 38, the two appendages alternately and respectively pass over lever 53a and lever 54a, thus closing or opening second switch 53 and second switch 54. While cover panel platform 49 is generally symmetrical so as to interact with electric motor 36 and electric motor 37, exceptions to the general symmetry exist for functional purposes. Examples of this is the location of the appendages 53b and 54b and the location of second switch 53 and second switch 54. The second switches 53 and 54 are staggered so that only one circuit is completely closed at any one time, and, thus, either the circuit for electric motor 36 is completely closed and the cover panel 38 extends over the eating area or the circuit for electric motor 37 is fully closed and the cover panel 38 retracts. The appendages 53b and 54b are placed on the cover panel platform 49 such that when the cover panel 38 is fully extended over the eating area 40, appendage A 53b depresses lever 53a and lever 54a is open. When the cover panel 38 is fully retracted, appendage 54b depresses lever 54a and lever 53a is left open. Thus, when either lever 53a is opened or when lever 54a is opened, the circuit associated with that motor is opened and the motor stops. In this manner, the length of the extension or retraction is controlled and the power supply 45, which in this case is shown as two batteries, one for each electric motor 36, 37 circuit, is minimally used and power conservation is maximized.

The feeder 30 also has an on/off switch 46 attached to both circuits to further save on power and to use the restricted access animal feeder only when access does indeed need to be restricted.

Defined in detail, the present invention is a restricted access animal feeder, comprising: (a) an activation means comprising a pendant that hangs from a collar worn by an animal, the pendant affixed to the collar by affixation means, the pendant retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet; (b) a feeder comprising a housing having a means for retaining animal food, shield means to enable access to the food from only one location, adjustment means to enable the height of the means for retaining animal food to be raised or lowered, adjustment means to enable an area between the shield and the food retaining means to be increased or decreased, the housing retaining a movable cover which moves over the means for retaining animal food to prevent access to the food retaining means and is retractable back into the housing to permit access to the food retaining means, the movement of the cover created by a sliding mechanism connected to at least one electric motor which is connected to a magnetic switch; and (c) the housing having magnetic sensor means which is activated when the pendant having the two magnets is adjacent the housing, the sensor means causing the magnetic switch connected to a power supply to close when activated so that the electric motor connected to the power supply is activated and activates means which causes the cover to move from one location in the housing to another location in the housing.

Defined more broadly, the present invention is a restricted access animal feeder, comprising: (a) an activation means comprising an attachment to collar worn by an animal, the attachment retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet; (b) a feeder comprising a housing having a means for retaining animal food, the housing retaining a movable cover which moves over the means for retaining animal food to prevent access to the food retaining means and is retractable back into the housing to permit access to the food retaining means, the movement of the cover created by a sliding mechanism connected to at least one electric motor which is connected to a magnetic switch; and (c) the housing having magnetic sensor means which is activated when the attachment having the two magnets is adjacent the housing, the sensor means causing the magnetic switch connected to a power supply to close when activated so that the electric motor connected to the power supply is activated and activates means which causes the cover to move from one location in the housing to another location in the housing.

Defined even more broadly, the present invention is a restricted access animal feeder, comprising: (a) an activation means comprising an attachment to collar worn by an animal, the attachment retaining at least one permanent magnet; (b) a feeder comprising a housing having a means for retaining animal food, shield means to enable access to the food from only one location, adjustment means to enable an area between the shield and the food retaining means to be increased or decreased, the housing retaining a movable cover which moves over the means for retaining animal food to prevent access to the food retaining means and is retractable back into the housing to permit access to the food retaining means, the movement of the cover created by a sliding mechanism connected to at least one electric motor which is connected to a magnetic switch; and (c) the housing having magnetic sensor means which is activated when the attachment having the at least one permanent magnet is adjacent the housing, the sensor means causing the magnetic switch connected to a power supply to close when activated so that the electric motor connected to the power supply is activated and activates means which causes the cover to move from one location in the housing to another location in the housing.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A restricted access animal feeder, comprising:
    a. an activation means comprising a pendant that hangs from a collar worn by an animal, the pendant affixed to the collar by affixation means, the pendant retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet;
    b. a feeder comprising a housing having a means for retaining animal food, shield means to enable access to the food from only one location, adjustment means to enable the height of the means for retaining animal food to be raised or lowered, adjustment means to enable an area between the shield and the food retaining means to be increased or decreased, the housing retaining a movable cover which moves over the means for retaining animal food to prevent access to the food retaining means and is retractable back into the housing to permit access to the food retaining means, the movement of the cover created by a sliding mechanism connected to at least one electric motor which is connected to a magnetic switch; and
    c. the housing having magnetic sensor means which is activated when the pendant having the two magnets is adjacent the housing, the sensor means causing the magnetic switch connected to a power supply to close when activated so that the electric motor connected to the power supply is activated and activates means which causes the cover to move from one location in the housing to another location in the housing.

2. The restricted access animal feeder in accordance with claim 1 wherein the cover is initially in the housing at a location where access to the means for retaining animal food is available and when the magnetic sensor means is activated, the electric motor activates the cover moving means so that the cover moves to a location which prevents access to the means for retaining animal food.

3. The restricted access animal feeder in accordance with claim 1 wherein the cover is initially at a location which prevents access to the means for retaining animal food and when the magnetic sensor means is activated, the electric motor activates the cover moving means so that the cover moves to a location which enables access to the means for retaining animal food.

4. The restricted access animal feeder in accordance with claim 1 wherein the cover and the cover moving means further comprising:
    a. the cover having a cover panel mounted on a cover panel platform which is supported by a vertical guide which supports rolling wheels to facilitate movement of the cover; and
    b. intermeshing gear means on the cover panel platform and the at least one electric motor which causes a sliding movement of the cover from one location to another when the at least one electric motor is activated.

5. The restricted access animal feeder in accordance with claim 4 further comprising:
    a. the vertical guide having two pairs of wheels, one pair of wheels along a bottom of the vertical guide to roll along a base area of the housing and the second pair of wheels to roll along a ceiling area of the housing; and
    b. affixed to the vertical guide is a horizontal bar which supports at least one bumper to provide a smooth and quiet stop to the retraction movement of the cover panel and at least one backstop provided for each bumper.

6. The restricted access animal feeder in accordance with claim 1 wherein the cover and the cover moving means further comprising:
    a. the cover having a cover panel internally connected to a pair of electric motors which retract and extend the cover panel over the means for retaining animal food, the cover panel having a pair of fenders which have the dual purpose of guiding the cover panel in a straight manner during the extension and retraction of the cover panel and act as a further insurance that the cover panel does not retract fully within the interior of the housing; and
    b. the cover panel is mounted on a cover panel platform, the cover panel platform supports and is mounted on the cover panel by a transverse cross bar that extends from a vertical guide to an end of the cover panel, the transverse cross bar also functioning as a double sided linear rack, the vertical guide having vertical guide wheels to facilitate the movement of the cover.

7. The restricted access animal feeder in accordance with claim 6 further comprising:
    a. a first electric motor associated with the extension of the cover panel over the means for retaining animal food and a second electric motor associated with the retraction of the cover panel from the food retaining means, each electric motor is connected to a power supply which is connected to a magnetic switch which is closed when the sensor is activated, each electric motor is operationally connected to a rotary gear, each rotary gear respectively lies along one side of and meshes with the teeth of a double sided linear rack; and b. each rotary gear freely movable independent of their respective motors so that when the rotary gear associated with the first electric motor is engaged by the first electric motor and is moving the double sided linear rack, the rotary gear associated with the second electric motor freely rotates according to the movement of the double sided linear rack without damage to or impedance from second electric motor to which it is operationally connected, and when the gear associated with the second electric motor is engaged by the second electric motor and is moving the double sided linear rack, the rotary gear associated with the first electric motor freely rotates according to the movement of the double sided linear rack without damage to or impedance from the first electric motor to which it is operationally connected.

8. The restricted access animal feeder in accordance with claim 7 further comprising:
   a. circuits for the two electric motors are designed in a manner that the circuit for each motor has two places where the circuit can be open, the first is at the magnetic switch which is activated by the sensor, the default condition for the magnetic switch associated with the first electric motor is open and the default condition for the magnetic switch associated with second electric motor is closed; and
   b. when the sensor activates the magnetic switch, the default conditions of each circuit changes so that the magnetic switch associated with the first electric motor closes and the magnetic switch associated with the second electric motor opens.

9. The restricted access animal feeder in accordance with claim 8 further comprising:
   a. the second location in the electric motor circuits where the circuit may be opened is at second switches where the second switches are closed when respective levers associated with the switches are depressed, the default condition for the lever which is associated with the first electric motor is in a closed position and the default condition for lever associated with the second electric motor is in an opened position; and
   b. operational means on the cover panel platform so that as the cover panel platform moves to and fro within the housing when it extends and retracts the cover panel, two appendages alternately and respectively pass over at least one lever thus closing or opening the first switch or the second switch.

10. A restricted access animal feeder, comprising:
    a. an activation means comprising an attachment to collar worn by an animal, the attachment retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet;
    b. a feeder comprising a housing having a means for retaining animal food, the housing retaining a movable cover which moves over the means for retaining animal food to prevent access to the food retaining means and is retractable back into the housing to permit access to the food retaining means, the movement of the cover created by a sliding mechanism connected to at least one electric motor which is connected to a magnetic switch; and
    c. the housing having magnetic sensor means which is activated when the attachment having the two magnets is adjacent the housing, the sensor means causing the magnetic switch connected to a power supply to close when activated so that the electric motor connected to the power supply is activated and activates means which causes the cover to move from one location in the housing to another location in the housing.

11. The restricted access animal feeder in accordance with claim 10 further comprising:
    the housing having shield means to enable access to the food from only one location.

12. The restricted access animal feeder in accordance with claim 11 further comprising:
    a. adjustment means to enable the height of the means for retaining animal food to be raised or lowered; and
    b. adjustment means to enable an area between the shield and the food retaining means to be increased or decreased.

13. The restricted access animal feeder in accordance with claim 10 wherein the cover is initially in the housing at a location where access to the means for retaining animal food is available and when the magnetic sensor means is activated, the electric motor activates the cover moving means so that the cover moves to a location which prevents access to the means for retaining animal food.

14. The restricted access animal feeder in accordance with claim 10 wherein the cover is initially at a location which prevents access to the means for retaining animal food and when the magnetic sensor means is activated, the electric motor activates the cover moving means so that the cover moves to a location which enables access to the means for retaining animal food.

15. The restricted access animal feeder in accordance with claim 10 wherein the cover and the cover moving means further comprising:
    a. the cover having a cover panel mounted on a cover panel platform which is supported by a vertical guide which supports rolling wheels to facilitate movement of the cover; and
    b. intermeshing gear means on the cover panel platform and the at least one electric motor which causes a sliding movement of the cover from one location to another when the at least one electric motor is activated.

* * * * *